(12) United States Patent
Mothersele

(10) Patent No.: US 9,428,114 B2
(45) Date of Patent: Aug. 30, 2016

(54) REMOTE DEPLOYMENT GUN SAFE

(71) Applicant: Charles L. Mothersele, Fishers, IN (US)

(72) Inventor: Charles L. Mothersele, Fishers, IN (US)

( * ) Notice: Subject to any disclaimer, the term of this patent is extended or adjusted under 35 U.S.C. 154(b) by 45 days.

(21) Appl. No.: 13/690,217

(22) Filed: Nov. 30, 2012

(65) Prior Publication Data

US 2013/0134193 A1  May 30, 2013

Related U.S. Application Data

(60) Provisional application No. 61/565,243, filed on Nov. 30, 2011.

(51) Int. Cl.
| | |
|---|---|
| *B60R 7/14* | (2006.01) |
| *E05G 1/00* | (2006.01) |
| *F41C 33/06* | (2006.01) |
| *B60R 7/00* | (2006.01) |
| *A47B 81/00* | (2006.01) |
| *E05B 65/00* | (2006.01) |

(52) U.S. Cl.
CPC .............. *B60R 7/00* (2013.01); *A47B 81/005* (2013.01); *B60R 7/14* (2013.01); *E05B 65/0075* (2013.01); *E05G 1/005* (2013.01); *F41C 33/06* (2013.01); *Y10T 70/7062* (2015.04)

(58) Field of Classification Search
CPC .......... B60R 7/14; F41C 33/06; E05G 1/005
USPC ............. 224/281, 538, 539, 569, 912; 70/63
See application file for complete search history.

(56) References Cited

U.S. PATENT DOCUMENTS

| | | | | |
|---|---|---|---|---|
| 4,494,806 | A * | 1/1985 | Williams et al. | 312/333 |
| 5,511,711 | A * | 4/1996 | Kunz | 224/539 |
| 5,683,021 | A * | 11/1997 | Setina | 224/311 |
| 6,843,081 | B1 * | 1/2005 | Painter | 70/63 |
| 7,143,913 | B2 * | 12/2006 | Lindsey et al. | 224/413 |
| 8,020,416 | B2 * | 9/2011 | Talmage et al. | 70/85 |
| 8,162,330 | B2 * | 4/2012 | Melkumyan et al. | 280/47.34 |
| 8,186,188 | B1 * | 5/2012 | Brown | 70/63 |
| 8,430,461 | B1 * | 4/2013 | Cole | 312/204 |
| 8,506,023 | B2 * | 8/2013 | Goldie | 312/204 |
| 2011/0247950 | A1 * | 10/2011 | McGee | 206/317 |
| 2013/0299537 | A1 * | 11/2013 | Setina | 224/281 |
| 2014/0116303 | A1 * | 5/2014 | Mothersele | 109/64 |

* cited by examiner

*Primary Examiner* — Justin Larson
(74) *Attorney, Agent, or Firm* — Ice Miller LLP

(57) ABSTRACT

A remote deployment gun safe assembly. An exemplary assembly includes a top plate mounted to a package tray in a vehicle, a drawer assembly, a drawer slide mechanism, a deploying mechanism, and a locking mechanism. The assembly is configured to securely conceal a variety of different weapons. Upon activation of a remote switch, the gun safe assembly will unlatch and automatically deploy to expose the weapons for use. In other embodiments, the safe assembly may hold articles other than guns or weapons.

26 Claims, 4 Drawing Sheets

REMOTE DEPLOYMENT GUN SAFE

CROSS REFERENCE TO RELATED APPLICATIONS

The present application is related to, and claims the priority benefit of, U.S. Provisional Patent Application Ser. No. 61/565,243 filed Nov. 30, 2011, the contents of which are hereby incorporated in their entirety into the present disclosure.

BACKGROUND

Weapons stored in vehicles need to be securely concealed, but also need to be quickly accessible. Existing gun racks are bulky, take up valuable space, are gun specific, provide little protection from damage, and leave weapons in plain view. In the alternative, existing gun vaults only supply a locking drawer assembly. Accordingly, improved gun storage devices that do not have these limitations would be appreciated in the marketplace.

SUMMARY

In an exemplary embodiment of a remote deployment gun safe assembly of the present disclosure, the assembly comprises a top plate mounted to the package tray of a vehicle, a drawer assembly, a drawer slide mechanism, a deployment mechanism, and a locking mechanism. In another embodiment, the assembly comprises a top plate mounted in an enclosure, wherein one or more enclosures may mount in a vehicle, a drawer assembly, a drawer slide mechanism, a deployment mechanism, and a locking mechanism. The assembly is configured to securely conceal a variety of different weapons. Upon activation of a remote switch, the gun safe assembly will unlatch and automatically deploy to expose the weapons for use.

In an exemplary embodiment of a remote deployment gun safe assembly of the present disclosure, a drawer assembly comprises a bottom wall, a hinged front end wall, a rear end wall, a left side wall, and a right side wall; wherein the bottom wall, end walls and the side walls are connected to define an open top for receiving and removing contents. In another embodiment, the front end wall does not contain a hinge. The components of the drawer assembly may be composed of steel, wood, or plastic; and may be connected together by rivets, screws or welding as appropriate.

In an exemplary embodiment of a remote deployment gun safe assembly of the present disclosure, a drawer slide mechanism is attached to the drawer assembly and top plate. The drawer slide mechanism comprises a first left drawer slide rail, a second left drawer slide rail, a first right drawer slide rail, and a second right drawer slide rail. With each of the side rails affixed, the top plate and the drawer assembly are joined to allow movement of the drawer assembly to an open and closed position.

In an exemplary embodiment of a remote deployment gun safe assembly of the present disclosure, a deployment mechanism is attached to the drawer assembly. The deployment mechanism comprises a linear actuator member, a damper, a drawer mounting bracket, and a top plate mounting bracket. The linear actuator member connects to the drawer assembly and the top plate via the mounting brackets. The linear actuator member may be comprised of a spring, spring gas or a motorized device. After automatic deployment, the drawer assembly is returned to the closed position by applying manual pressure to the front end wall until the door latches, later described herein, are engaged. In embodiments that use a motorized device, current is reversed to drive the drawer assembly in a backward direction until the door latches are engaged.

In an exemplary embodiment of a remote deployment gun safe assembly of the present disclosure, a locking mechanism is attached to the front end wall. In some embodiments, the locking mechanism comprises an electrically powered latch release and a manually operated lock set. The electrically powered latch release, connected through the vehicle electrical system, is comprised of a solenoid, a relay, and a switch in electrical communication with one another and mechanically coupled to the manually operated lock set. The switch selected for the locking mechanism may be wired or wireless. In one embodiment, when the wired switch is actuated, current is sent from a source of power through the relay(s) to the solenoid(s) to turn the manually operated lock set and thus disengage the latches from the left and right side walls. In another embodiment, when the wireless switch is remotely actuated, current is sent from a source of power through the relay(s) to the solenoid(s) to turn the manually operated lock set and thus disengage the latches from the left and right side walls. In another embodiment, or in the alternative if the electrical system fails, a manually operated lock set is used to release the drawer assembly. In an exemplary embodiment, the manually operated lock set is mechanically coupled to a left lock latch and a right lock latch using cables or rods. Turning the manually operated lock latch disengages the left and right lock latches to allow the drawer assembly to deploy to the open position.

BRIEF DESCRIPTION OF THE DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

Figure 1:
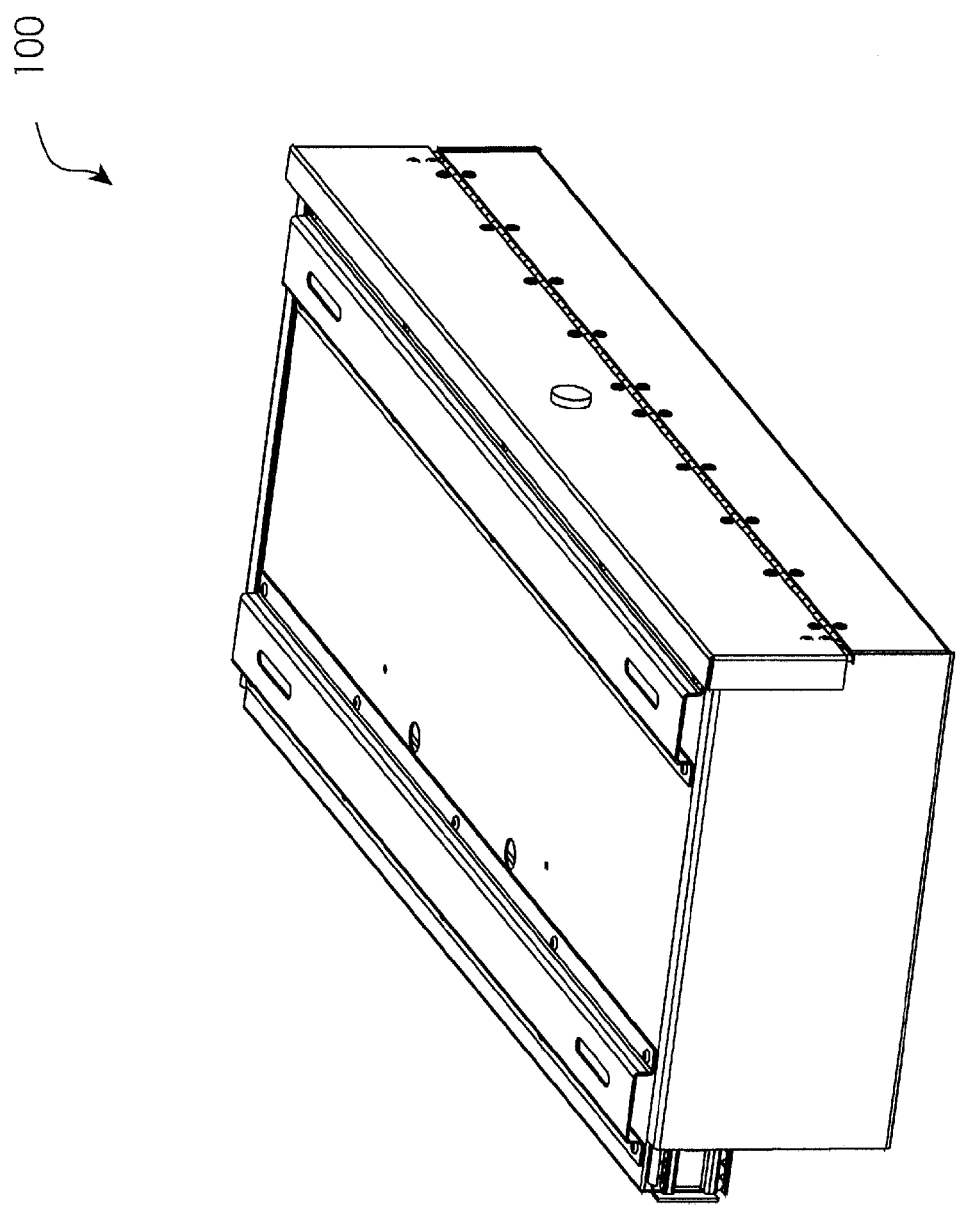
FIG. 1 shows an exemplary remote deployment gun safe assembly according to at least one embodiment of the present disclosure.

An overview of the features, functions and/or configuration of the components depicted in the figures will now be presented. It should be appreciated that not all of the features of the components of the figure are necessarily described. Some of these non-discussed features, as well as discussed features are inherent from the figure. Other non-discussed features may be inherent in component geometry and/or configuration.

DETAILED DESCRIPTION

For the purposes of promoting an understanding of the principles of the present disclosure, reference will now be made to the embodiments illustrated in the drawing, and specific language will be used to describe the same. It will nevertheless be understood that no limitation of the scope of this disclosure is thereby intended.

An exemplary embodiment of a gun safe assembly 100 of the present disclosure is shown in FIG. 1. In some embodiments, the gun safe assembly 100 may be mounted directly to a vehicle. In other embodiments, the gun safe assembly 100 may be mounted in an enclosure, which may be mounted to a vehicle or other surface.

Figure 2:
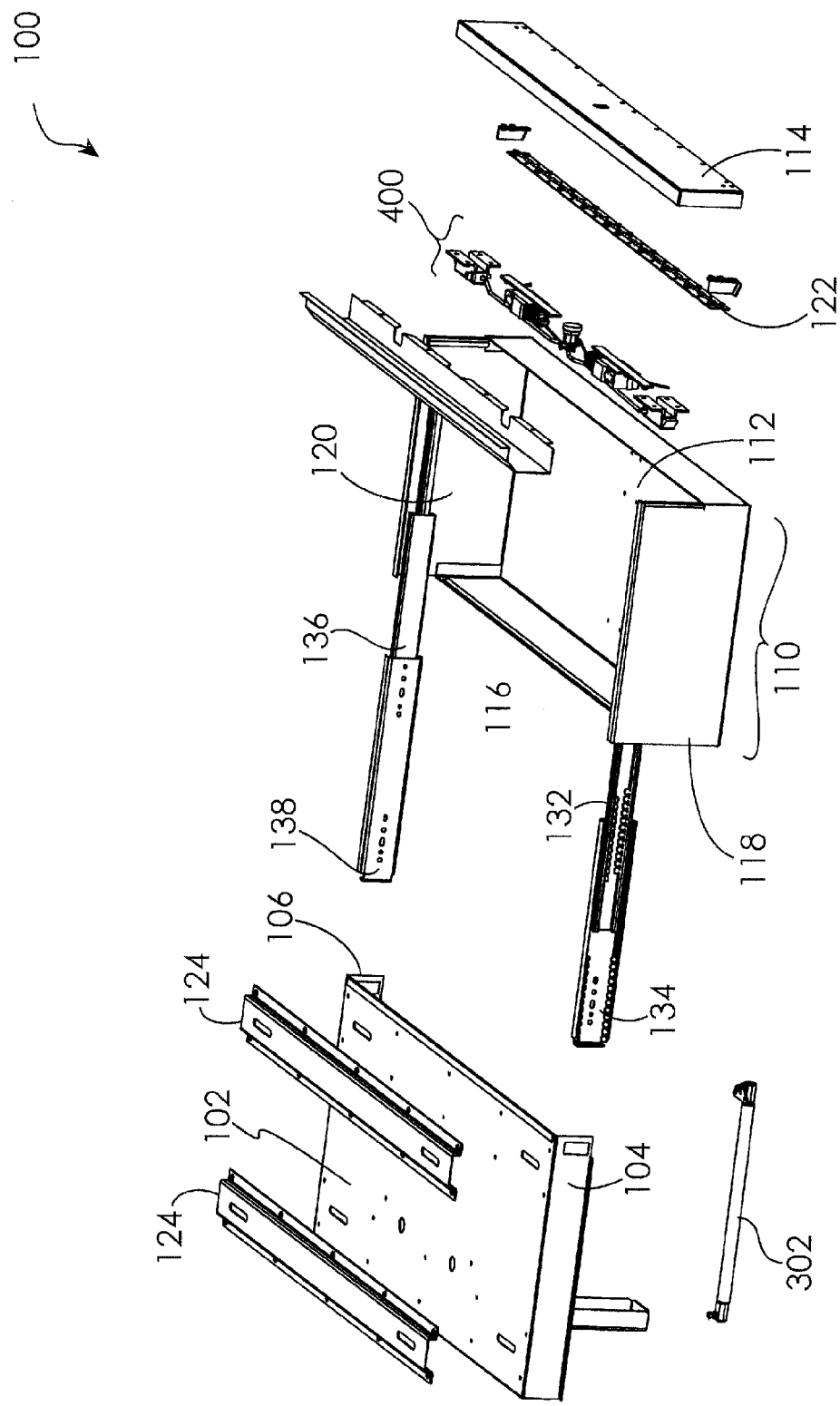
FIG. 2 shows an exploded view of an exemplary remote deployment gun safe assembly according to at least one embodiment of the present disclosure.

In the embodiment shown in FIG. 2, the gun safe assembly 100 comprises a top plate 102 having a top plate left side wall 104 and a top plate right side wall 106, a drawer assembly 110 having a bottom wall 112, front end wall 114, rear end wall 116, drawer assembly left side wall 118 and drawer assembly right side wall 120, wherein the bottom wall, end walls and the drawer assembly side walls are connected to define an open top for receiving and removing contents. A hinge 122 connects the front end wall 114 and the bottom wall 112 to allow the front end wall 114 to swing down during deployment (as described in greater detail hereinbelow). It will be appreciated that hinge 122 may be omitted and the front end wall may be connected in a fixed position. The components of the drawer assembly may be affixed via any convenient means, such as via rivets, screws or welding, to name just a few non-limiting examples. It will be appreciated in view of the present disclosure that the means used for affixing the components to one another is not critical in the presently disclosed embodiments. Furthermore, top plate 102 and drawer assembly 110 may be composed of any convenient material, such as steel, wood, or plastic, to name just a few non-limiting examples. It will be appreciated in view of the present disclosure that the materials used for the components is not critical in the presently disclosed embodiments. In some embodiments, top plate 102 of the gun safe assembly is affixed under a package tray in the trunk of a vehicle (not shown) using mounting brackets 124. In other embodiments, top plate 102 of the gun safe assembly is affixed to the interior of an enclosure (not shown) using mounting brackets 124, wherein the enclosure is affixed to the floor of a vehicle, such as the cargo compartment of a sport utility vehicle. Furthermore, a plurality of enclosures may be placed in a stacked configuration when more than one gun safe assembly 100 is desired. It will be appreciated in view of the present disclosure that the means used for affixing the enclosure to the floor of the vehicle is not critical in the presently disclosed embodiments.

In the exemplary embodiment, drawer assembly 110 is capable of movement between an open and closed position via a drawer slide mechanism. The drawer slide mechanism, as shown in FIG. 2 comprises a first left drawer slide rail 132, a second left drawer slide rail 134, a first right drawer slide rail 136, and a second right drawer slide rail 138. The first left drawer slide rail 132 affixes for sliding engagement with an interior surface of the drawer assembly left side wall 118; the second left slide rail 134 affixes for sliding engagement with an exterior surface on the top plate left side wall 104. The first right drawer slide rail 136 affixes for sliding engagement with an interior surface of the drawer assembly right side wall 120; the second right slide rail 138 affixes for sliding engagement with an exterior surface on the top plate right side 106. With each of the side rails affixed, the top plate 102 and the drawer assembly 110 are joined to allow sliding movement of the drawer assembly 110 between an open and closed position.

Figure 3:
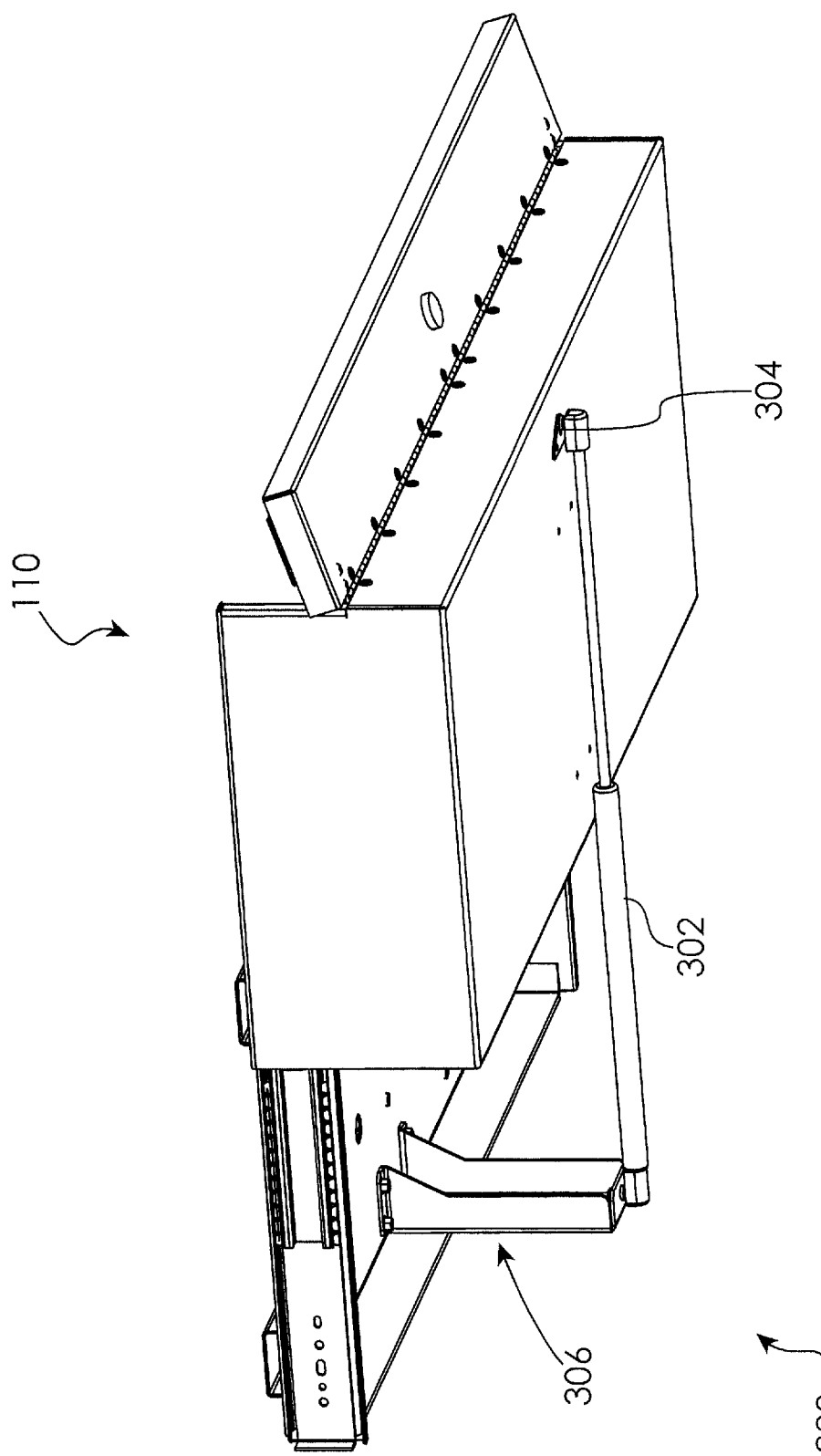
FIG. 3 shows a bottom perspective view of an exemplary remote deployment gun safe assembly according to at least one embodiment of the present disclosure.

In an exemplary embodiment, drawer assembly 110 is automatically deployed using a deployment mechanism. The deployment mechanism, as shown in FIG. 3, comprises a linear actuator member 302, a drawer mounting bracket 304, a top plate mounting bracket 306, and a damper (not shown). The proximal end of linear actuator member 302 is affixed to drawer assembly 110 using drawer mounting bracket 304. The distal end of linear actuator member 302 is affixed to one end of top plate mounting bracket 306. The opposite end of top plate mounting bracket 306 is affixed to the bottom side of top plate 102. A damper (not shown) is connected to the linear actuator member to control the speed at which drawer assembly 110 is deployed. Linear actuator member 302 may be comprised of any device that may be used to create linear motion, such as a spring, a gas spring or a motorized device such as a stepper motor and gear train or motor and lead screw, to name just a few non-limiting examples. It will be appreciated in view of the present disclosure that the means for causing linear displacement of the drawer assembly 110 is not critical to the presently disclosed embodiments. In the embodiments where linear actuator member 302 is a spring or a gas spring, drawer assembly 110 is returned to a closed position by applying manual pressure to front end wall 114 of drawer assembly 110 until the locking mechanism (described hereinbelow) is engaged. In the embodiments where linear actuator member 302 includes a motorized device, current is used to drive the motorized device to cause the drawer assembly 110 to move in a forward direction to an open position. To return drawer assembly 110 to a closed position, current supplied to the motorized device is reversed to drive the drawer assembly 110 in a backward direction.

Figure 4:
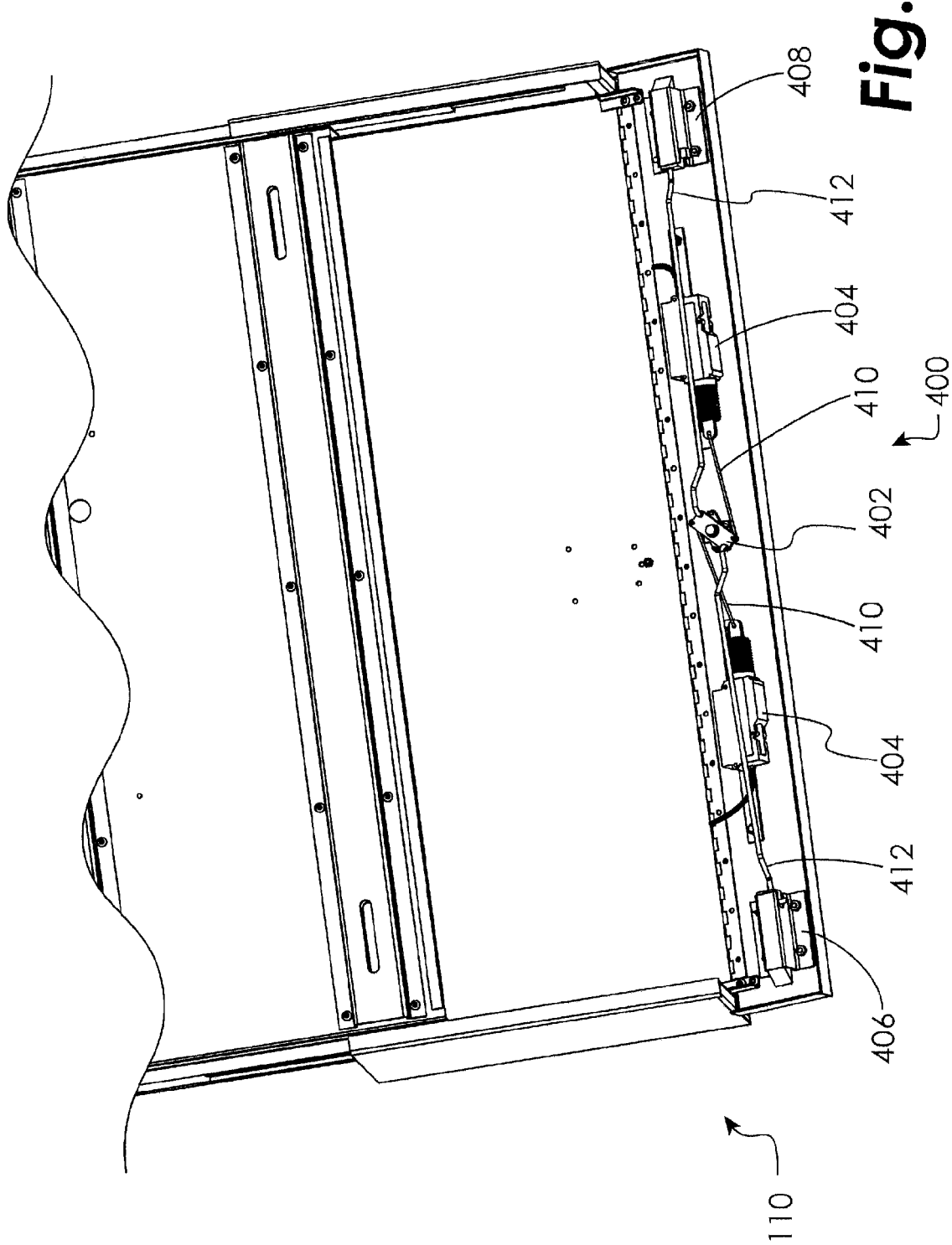
FIG. 4 shows a top perspective view of an exemplary remote deployment gun safe assembly according to at least one embodiment of the present disclosure.

In an exemplary embodiment, drawer assembly 110 comprises a locking mechanism. Locking mechanism 400, as shown in FIG. 4, affixes to the interior of front end wall 114. Locking mechanism 400 comprises at least one electrically powered latch release 404 mechanically coupled to a manually operated lock set 402 using attachment mechanism 410. Each of the at least one electrically powered latch release 404 comprises a solenoid, a relay, and a switch in electrical communication with one another. Attachment mechanism 410 is comprised of rods or cables. In the illustrated embodiment, two electrically powered latch releases 404 are used. The size of the at least one electrically powered latch release is dependent upon the size and weight of the drawer assembly.

Manually operated lock set 402 is mechanically coupled to a left lock latch 406 and a right lock latch 408 by attachment mechanism 412. Attachment mechanism 412 is comprised of cables or rods. Manually operated lock set 402 operates such that when a key is placed inside manually operated lock set 402 and turned, left lock latch 406 and right lock latch 408 are disengaged from left side wall 118 and right side wall 120 respectively such that drawer assembly 110 may be deployed to an open position. It will be appreciated that there may be only one lock latch located either on the left side, right side or in the center of front end wall 114.

In one embodiment, when a wired switch (not shown) is actuated, current is sent from a source of power (not shown) through the relay(s) to the solenoid(s) to turn the manually operated lock set and thus disengage left lock latch 406 and right lock latch 408. When the left lock latch and right lock latch are disengaged, linear actuator member 302 extends the drawer assembly to an open position.

In another embodiment, when a wireless switch (not shown) is remotely actuated, current is sent from a source of power (not shown) through the relay to the solenoid(s) to turn the manually operated lock set and thus disengage left lock latch 406 and right lock latch 408. When the left lock latch and right lock latch are disengaged, linear actuator member 302 extends the drawer assembly to an open position.

It will be appreciated from the above described embodiments that the gun safe assembly 100 may be mounted in an inconspicuous location, such as under the rear package shelf of a vehicle. In this location, the gun safe assembly 100 displaces very little of the usable cargo space in the vehicle and does not draw attention to itself. It will also be appreciated from the above described embodiments that an enclosure may be used to mount a gun safe assembly to a vehicle or other surface. Furthermore, when more than one gun safe assembly 100 is desired, multiple enclosures may be used, wherein at least one enclosure is mounted to the floor of a vehicle.

When a weapon or other item is to be removed from the gun safe assembly 100, the lock set 402 may be disengaged and the drawer assembly 110 will open automatically. This is especially desirable in law enforcement applications, where an officer may need to retrieve a weapon quickly during an emergency. Use of a wireless remote entry device allows the officer to push one button to open the gun safe assembly 100 and extend the drawer assembly 110, placing the contents within easy reach. It will be appreciated from the present disclosure that the assembly 100 may be used to securely store any item or items, such as jewelry by way of non-limiting example, and is not limited only for the storage of weapons.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. A safe assembly for a vehicle, the safe assembly comprising:
   a top plate;
   a drawer assembly having:
      a bottom wall, comprising:
         a first bottom wall portion; and
         a second bottom wall portion extending substantially 90 degrees from the first bottom wall portion;
      a rear end wall;
      a front end wall attached to the second bottom wall portion by at least one hinge; and
      left and right opposing side walls, said end and side walls cooperating to define an open top for receiving and removing contents;
   a drawer slide mechanism coupling the drawer assembly to the top plate to permit movement of the drawer assembly between an open position and a closed position;
   a deployment mechanism coupled to the drawer assembly and the top plate; and
   a locking mechanism coupled to the front end wall of the drawer assembly, the locking mechanism having an unlocked position and a locked position, wherein the deployment mechanism is configured and arranged to move the drawer assembly to the open position when the locking mechanism is placed in the unlocked position, wherein the at least one hinge allows the front end wall to fold down upon deployment to the open position.

2. The assembly of claim 1, wherein at least one weapon is stored therein.

3. The assembly of claim 1, wherein the top plate is mounted under a package tray in a trunk of a vehicle.

4. The assembly of claim 1, wherein the drawer slide mechanism comprises:
   a first left drawer slide rail, wherein the first left drawer slide rail affixes for sliding engagement with an interior surface of the drawer assembly left side wall; and
   a second left drawer slide rail, wherein the second left slide rail affixes for sliding engagement with an exterior surface on the top plate left side wall; and
   a first right drawer slide rail, wherein the first right drawer slide rail affixes for sliding engagement with an interior surface of the drawer assembly right side wall; and
   a second right drawer slide rail, wherein the second right slide rail affixes for sliding engagement with an exterior surface on the top plate right side.

5. The assembly of claim 1, wherein the locking mechanism comprises a manually operated lock set, wherein the manually operated lock set is mechanically coupled to at least one lock latch.

6. The assembly of claim 1, wherein the locking mechanism comprises at least one electrically powered latch release mechanically coupled to a manually operated lock set, wherein the manually operated lock set is mechanically coupled to at least one lock latch.

7. The assembly of claim 6 wherein the at least one electrically powered lock release comprises a solenoid, a relay and a switch in electrical communication.

8. The assembly of claim 7 wherein the switch is selected from the group consisting of: wired and wireless.

9. The assembly of claim 1 wherein the deployment mechanism comprises a linear actuator member and a damper.

10. The assembly of claim 9 where in the linear actuation member is a spring.

11. The assembly of claim 9 wherein the linear actuation member is a gas spring.

12. The assembly of claim 9 wherein the linear actuation member is a motorized device.

13. The assembly of claim 12, wherein the motorized device is selected from the group consisting of: motor-driven lead screw and motor-driven gear.

14. A safe assembly for a vehicle, the safe assembly comprising:
   a top plate;
   a drawer assembly having:
      a bottom wall, comprising:
         a first bottom wall portion; and
         a second bottom wall portion extending substantially 90 degrees from the first bottom wall portion;
      a rear opposing end wall;
      a front end wall attached to the second bottom wall portion by at least one hinge; and
      left and right opposing side walls, said end and side walls cooperating to define an open top for receiving and removing contents;
   a drawer slide mechanism coupling the drawer assembly to the top plate to permit movement of the drawer between an open position and a closed position;
   a deployment mechanism coupled to the drawer assembly and the top plate; and
   a locking mechanism coupled to the front end wall of the drawer assembly, wherein the locking mechanism is remotely actuated and when actuated allows the deployment mechanism to slide the drawer assembly along the drawer slide mechanism to an open position, wherein the at least one hinge allows the front end wall to fold down upon deployment to the open position.

15. The assembly of claim 14, wherein at least one weapon is stored therein.

16. The assembly of claim 14, wherein the top plate is mounted under a package tray in a trunk of a vehicle.

17. The assembly of claim 14, wherein the drawer slide mechanism comprises:
   a first left drawer slide rail, wherein the first left drawer slide rail affixes for sliding engagement with an interior surface of the drawer assembly left side wall; and
   a second left drawer slide rail, wherein the second left slide rail affixes for sliding engagement with an exterior surface on the top plate left side wall; and
   a first right drawer slide rail, wherein the first right drawer slide rail affixes for sliding engagement with an interior surface of the drawer assembly right side wall; and
   a second right drawer slide rail, wherein the second right slide rail affixes for sliding engagement with an exterior surface on the top plate right side.

18. The assembly of claim 14, wherein the locking mechanism comprises a manually operated lock set, wherein the manually operated lock set is mechanically coupled to at least one lock latch.

19. The assembly of claim 14, wherein the locking mechanism comprises at least one electrically powered latch release mechanically coupled to a manually operated lock set, wherein the manually operated lock set is mechanically coupled to at least one lock latch.

20. The assembly of claim 19 wherein the at least one electrically powered lock release comprises a solenoid, a relay and a switch in electrical communication.

21. The assembly of claim 20 wherein the switch is selected from the group consisting of: wired and wireless.

22. The assembly of claim 14 wherein the deployment mechanism comprises a linear actuator member and a damper.

23. The assembly of claim 22 where in the linear actuation member is a spring.

24. The assembly of claim 22 wherein the linear actuation member is a gas spring.

25. The assembly of claim 22 wherein the linear actuation member is a motorized device.

26. The assembly of claim 25, wherein the motorized device is selected from the group consisting of: motor-driven lead screw and motor-driven gear.

* * * * *